3,086,932
PROCESS FOR PRODUCING AND RECOVERING ORGANIC NUCLEAR REACTOR COOLANT-MODERATORS
Robert O. Bolt, San Rafael, and William W. West, El Cerrito, Calif., assignors, by mesne assignments, to the United States of America as represented by the United States Atomic Energy Commission
No Drawing. Filed Nov. 30, 1959, Ser. No. 856,321
3 Claims. (Cl. 204—193.2)

The present invention relates, in general, to the production and recovery of polyphenyl coolants from intractable polyphenyl tars or residues and, more particularly, to the treatment of intractable, insoluble tarry residues obtained from coolants or moderators employed in nuclear reactors for conversion into useful moderator-coolant products.

Varieties of aromatic hydrocarbons have been utilized or have been proposed or investigated for use as coolants or moderators in nuclear reactors including polyphenyls, aromatic condensed ring compounds, aromatic ethers and alkylated aromatic hydrocarbons. Polyphenyl hydrocarbons, especially biphenyl, the terphenyls and the quaterphenyls are suitable for such use due to superior radiolytic and pyrolytic resistance and other requisite properties as disclosed in the copending application of Beppino J. Fontana et al., S.N. 599,352, filed July 23, 1956, now abandoned. Ordinarily, mixtures of a fluid nature or low melting point solids corresponding to lower average molecular weights or eutectic mixtures are preferred. Upon long continued use in the high temperature intense radiation environment of the reactor the organic mixtures show increases in viscosity with higher molecular weight materials being formed therein. Eventually, insoluble high molecular weight materials may form which materials precipitate to plug reactor passages and create a hazard to further operation of the reactor. Accordingly, in conventional practice the mixture employed in the reactor is periodically replaced or reconditioned by separating the tarry constituents by distillation, precipitation, extraction, etc. The tarry residues obtained in such reconditioning operations represent an expensive loss of the coolant or moderator material and the indicated changes of composition of the coolant lead to greater pumping cost, lower heat transfer as well as other higher operating costs for such a reactor.

Nuclear reactors employing organic moderators and coolants are well known in the art. A reactor employing biphenyl as a moderator is disclosed in U.S. Patent No. 2,708,656, issued May 17, 1955, to E. Fermi et al. The use of organic liquids as coolants is also disclosed in Chapter 8 of "Principles of Nuclear Reactor Engineering," Glasstone, Van Nostrand Co., Inc., 1955. A bibliography of publications relating to such reactors is presented in "Selected Abstracts on the Use of Organic Materials as Reactor Moderator-Coolants," G. Naish and R. W. Bowring, AERE Report inf/Bib 105. Moreover, biphenyl-terphenyl mixtures have successfully been utilized in the OMRE (organic moderated reactor experiment). C.f. "Details of OMRE" Nucleonics, vol. 14, No. 5, page 22, May 1956.

The reactions which occur upon radiolytic pyrolysis of the initial coolant-moderator mixtures are complex but generally tend to increase molecular weight, e.g., by converting lower polyphenyls to higher, polymerizing or combining unsaturated radiolysis products, etc., to progressively produce a less desirable coolant and finally a material which is not suitable for further use and which must be replaced. Any substantial change such as reduction of the proportion of lower molecular polyphenyls and increases of the proportion of higher polyphenyls is an undesirable tendency. This is true as well for other hydrocarbons, e.g., partially hydrogenated or alkylated polyphenyls.

The present invention is predicated on the discovery that catalytic hydrogenolysis of different polyphenyls produces a marked reversion or conversion of higher molecular weight constituents of aromatic and especially polyphenyl mixtures having undesirable characteristics into lower molecular weight mixtures of more useful and desirable coolant-moderator types. Most unexpectedly hydrogenolysis, i.e., ring cleavage occurs with little ring hydrogenation which might have been expected. Thus, highly damaged reactor coolant-moderator materials may be reconditioned or various component fractions thereof separated and treated to provide a material which is highly satisfactory for reuse in the reactor.

Accordingly, it is an object of the present invention to provide a method for reconditioning coolant-moderator materials for use in a nuclear reactor.

Another object of the invention is to employ a catalytic hydrogenolysis treatment for converting higher molecular weight reactor coolant-moderators into more desirable coolant-moderators.

Still another object of the invention is to provide a method of converting high molecular weight intractable tarry components of aromatic hydrocarbon coolant-moderators into coolant types suitable for use in a nuclear reactor.

A further object of the invention is to employ a catalytic hydrogenolysis treatment for reconditioning polyphenyl moderator-coolants for use in a nuclear reactor.

Other objects and features of the invention will become apparent by consideration of the following detailed description.

The present invention contemplates the treatment of aromatic hydrocarbon mixtures employed as coolants and moderators or higher molecular weight fractions obtained therefrom by distillation, extraction, selective precipitation, etc. The process is especially applicable to the treatment of polyphenyl mixtures such as the damaged biphenyl-terphenyl coolant-moderator employed, e.g., in the OMRE and to other mixtures including, initially, biphenyl, terphenyls and quaterphenyls. Usually such initial mixtures are fluid or have a low melting point and may comprise a considerable proportion of biphenyl with terphenyl and quaterphenyls or eutectic mixtures. Alkylated biphenyl, terphenyls and minor amounts of quaterphenyls may likewise be employed. For the purposes of the invention, a radiation damaged mixture is one that has a higher average molecular weight or undesirable amounts of high molecular compounds and evidencing variously higher insoluble tar content, higher viscosity, melting point, etc. Certain polyphenyl synthesis methods may produce mixtures of too high a molecular weight which mixture may likewise be treated. A damaged reactor or coolant material of the character described may comprise discarded material, a bypass stream obtained from a reactor coolant system, residues obtained by selective separation from a reactor coolant circuit, or the like.

In accordance with the invention such a material is subjected to a hydrogenolysis treatment wherein a substantial portion of the higher molecular weight components are converted into lower molecular weight components such as biphenyl, terphenyl and alkylated derivatives thereof which constitute superior reactor coolant-moderator types. With source materials not originally too severely damaged the reaction product, after filtering and being separated from gaseous or low-boiling components, is reintroduced into the operating reactor as reconditioned material. With highly damaged materials, such as the insoluble, intractable tarry residues the reaction product may be fractionated, e.g., in distillation or vacuum distillation apparatus and the recovered lower molecular weight components may be used as makeup moderator-coolant or otherwise admixed with other components to provide moderator-coolants as in conventional practice.

In the hydrogenolysis treatment the damaged coolant-moderator mixture is contacted with hydrogen in the presence of a hydrogenolysis catalyst under high pressure and at elevated temperatures in appropriate batch or continuous flow high pressure equipment of conventional design. Generally speaking, it is contemplated that so-called "acid" cracking and mild hydrogenation catalysts are effective in producing hydrogenolysis of higher polyphenyls. More specifically $Al_2O_3$ (alumina) and certain mixtures of $Al_2O_3$ with CuO have been so employed. Suitable operating conditions are presented in Table I, infra.

TABLE I

| Conditions | Broad range | Preferred range |
|---|---|---|
| Time, hours | 0.1–8.0 | 4.0–8.0. |
| Temperature, °F | 800–1500 | 800–1,000. |
| Initial pressure, p.s.i.g | 0–2000 | 500–1,000. |
| Ratio of compound: $Al_2O_3$: CuO. | From 25:0.25:0 to 25:8:8. | From 25:2:1 to 25:4:0. |

General comments as to the effects of the specific catalyst type are summarized in the following chart:

cate ring cleavage which effectively divides high molecular polyphenyls to provide the desired lower molecular coolant-moderator compounds. It will be understood from the foregoing that if the original mixture includes polyphenyls of a higher molecular weight than terphenyl, e.g., quaterphenyls, et seq., a general lowering of molecular weight will be obtained with substantial amounts of biphenyl and terphenyl being produced. Such mixtures would correspond or could be easily blended to correspond to the superior coolant-moderators disclosed in the aforesaid copending application of Fontana et al. and publications supra. Hydrogenated polyphenyls which are produced under indicated conditions are less desirable compounds since radiation damage resistance is lower.

Further details will be presented in the following specific example illustrating the manner of operating the process of the invention:

EXAMPLE

Standardized amounts of terphenyl representative of higher molecular weight polyphenyls were reacted with hydrogen under high pressure and at an elevated temperature with various combinations of cracking and hydrogenation catalysts. The reagents comprised Monsanto m-terphenyl recrystallized from ethyl alcohol; aluminum oxide powder (Baker, reagent grade) as cracking catalyst; and copper oxide powder (Mallincrodt C.P.) as hydrogenation catalyst. The reagents were charged into a hydrogenation bomb and the bomb pressurized sequentially to 500 and 250 p.s.i.g. with $H_2$ to eliminate Chart

| Catalyst | Effect on biphenyl formation | Effect on ring hydrogenation | Effect on higher polyphenyl formation |
|---|---|---|---|
| Hydrogenation (CuO) | Increasing amounts decrease biphenyl formation. | Increasing amounts increase ring hydrogenation. | Increasing amounts probably reduce higher polyphenyl formation. |
| Cracking ($Al_2O_3$) | Increasing amounts probably increase biphenyl formation. | No ring hydrogenation obtained with cracking catalysts alone. | Increasing amounts probably increase higher polyphenyl formation. |

NOTE.—General comments: (1) Both ring-hydrogenation and hydrogenolysis reactions are strongly affected by temperature and reaction time. (2) It is likely that the catalyst for optimum operation (low conversions to higher polyphenyls and hydrogenated polyphenyls and high conversions to biphenyl) will be primarily a cracking catalyst, with a small amount of a mild hydrogenation catalyst.

Polyphenyls can be represented by the formula $$C_6H_5(C_6H_4)_nC_6H_5$$

wherein $n$ may be zero or a larger integer, i.e., 1, 2, 3 . . . Presumably, polyphenyl tars contain substantial amounts of materials in which $n$ is 2, 3 or larger while in desirable moderator-coolants $n$ is 0, 1 with at most minor amounts of quaterphenyls ($n=2$). The term "hydrogenolysis" as employed herein is intended to indiair and finally the desired hydrogen pressure was introduced. The bomb was then placed in a rocking hydrogenation furnace and heated to the desired temperature with reagent proportions and other conditions as summarized for several runs in the following Table II:

TABLE II

*Summary of Conditions for Terphenyl Hydrogenolysis Runs*

| Conditions | 6064-35 | 6064-39 | 6064-42 | 6064-45 | 6064-47 |
|---|---|---|---|---|---|
| Time, hours | 4 | 6 | 3 | 6 | 3. |
| Temperature, °F | 800 | 900 | 900 | 900 | 900. |
| Initial pressure, p.s.i.g | 1,500 | 500 | 500 | 500 | 1,000. |
| Terphenyl | m-Terphenyl | m-Terphenyl | o-Terphenyl | o-Terphenyl | o-Terphenyl. |
| Terphenyl charge, g | 25 | 25 | 25 | 25 | 50. |
| Catalyst | $Al_2O_3$-CuO | $Al_2O_3$-CuO | $Al_2O_3$-CuO | $Al_2O_3$ | $Al_2O_3$. |
| Catalyst charge, g.: | | | | | |
| $Al_2O_3$ | 2 | 4 | 4 | 4 | 8. |
| CuO | 1 | 1 | 1 | 0 | 0. |
| Ratio of compound: $Al_2O_3$:CuO charges | 25:2:1 | 25:4:1 | 25:4:1 | 25:4:0 | 25:4:0. |

Following hydrogenolysis the reaction products were removed from the bomb whereupon it was noted that the CuO in each instance was reduced to the metallic state. Catalyst was separated from the mixture and the mixture analyzed by means of a mass spectrograph with results presented below in Table III:

TABLE III

*Summary of Mass Spectrometer Analysis of Terphenyl Hydrogenolysis Runs*

| Mass | Probable identification | 6064-35 [1] | 6064-39 [2] | 6064-42 [2] | 6064-45 [2] | 6064-47 |
|---|---|---|---|---|---|---|
| 78 | Benzene | | [3] x | x | x | x |
| 152 | Biphenylene acenaphthylene | 1.1 | x | | x | x |
| 154 | Biphenyl | 0.9 | 4.6 | 6.8 | 30.0 | 22.1 |
| 176 | | | x | x | x | x |
| 178 | Diphenyl-acetylene anthracene phenanthrene | 4.5 | x | x | x | x |
| 180 | | 5.6 | | | | |
| 202 | Pyrene | 0.5 | | | | |
| 230 | Terphenyl | 65.7 | 87.9 | 82.8 | 59.6 | 52.4 |
| 234 | Tetrahydro-terphenyl | x | | | | |
| 236 | Hexahydro-terphenyl | 17.8 | x | x | | |
| 242 | Dodecahydro-terphenyl | 3.9 | | | | |
| 250 | | | x | x | x | x |
| 252 | Benzpyrene | | x | | x | |
| 276 | | x | x | | | |
| 278 | | | x | | | |
| 306 | Quaterphenyl | | 4.2 | 7.3 | 7.9 | 3.3 |
| 382 | Quinquephenyl | | 3.3 | 1.4 | 2.5 | 1.9 |
| 458 | Hexaphenyl | | | 1.7 | | 14.0 |
| 535 | Heptaphenyl | | | | | 6.3 |

[1] In calculating the components in 6064-35, certain assumptions concerning sensitivities had to be made. These assumptions are listed on 6205-15.
[2] Polyphenyl values for 6064-39, -42, and -45 are normalized to 100%. These polyphenyls comprise approximately 96% of the total product for these three runs.
[3] x denotes peak presence in small but undetermined amounts.

NOTE.—Figures in table refer to liquid volume percent concentration.

In practice the small proportions of polyphenyls above quaterphenyls shown would not seriously detract from the effectiveness of the mixtures as coolant-moderators, particularly when the mixtures are employed for makeup. The lower boiling materials could, of course, be separated, e.g., as by distillation and employed as coolants and the higher boiling material reprocessed.

While there has been described in the foregoing what may be considered to be preferred embodiments of the invention, modification may be made therein without departing from the spirit of the invention and it is intended to cover all such as fall within the scope of the appended claims.

What is claimed is:

1. In a process for producing a polyphenyl moderator-coolant from a mixture including higher polyphenyls, the steps comprising contacting an admixture of said higher polyphenyl mixture and hydrogen simultaneously with a catalyst including an alumina acid cracking catalyst together with a lesser proportion of CuO as a mild hydrogenation catalyst in the ratio range of 25:2:1 to 25:4:0, respectively, at a temperature in the range of about 800 to 1000° F. and a pressure in the range of 500 to 1,000 p.s.i.g. to cause hydrogenolysis of said higher polyphenyls to produce lower molecular weight polyphenyls and alkylated derivatives thereof in the reaction mixture, and fractionating said lower molecular weight polyphenyls from said reaction mixture.

2. In a process for reconditioning a radiation damaged polyphenyl nuclear reactor coolant-moderator mixture containing higher polyphenyls, the steps comprising withdrawing said damaged moderator-coolant from the nuclear reactor, contacting an admixture of said damaged reactor coolant-moderator and hydrogen simultaneously with a catalyst including an alumina acid cracking catalyst and CuO mild hydrogenation catalyst present in the ratio range of 25:2:1 to 25:4:0, respectively, at a temperature in the range of about 800 to 1000° F. and a pressure in the range of 500 to 1000 p.s.i.g. to cause hydrogenolysis of said higher polyphenyls to produce lower molecular weight polyphenyls and alkylated derivatives thereof in the reaction mixture, and then returning said coolant-moderator mixture to the reactor.

3. The process as defined in claim 2 wherein there is included the operation of fractionating said reaction mixture prior to return to said reactor.

References Cited in the file of this patent

UNITED STATES PATENTS

| | | |
|---|---|---|
| 2,033,878 | Burk | Mar. 10, 1936 |
| 2,297,769 | Ipatieff et al. | Oct. 6, 1942 |
| 2,344,258 | Miles | Mar. 14, 1944 |
| 2,355,219 | Ipatieff et al. | Aug. 8, 1944 |
| 2,364,719 | Jenkins | Dec. 12, 1944 |
| 2,800,518 | Pitzer | July 23, 1957 |
| 2,921,891 | Colichman | Jan. 9, 1960 |

OTHER REFERENCES

Atomic Energy Commission Document: ANL-5121, Engineering Properties of Diphenyl, Anderson, Aug. 11, 1953, pp. 14 and 15.

Catalysis, Sophia Berkman et al., pp. 629 and 847.